(12) United States Patent
Funderburg et al.

(10) Patent No.: US 12,147,807 B1
(45) Date of Patent: Nov. 19, 2024

(54) SYSTEMS AND METHODS OF TUNING SENSOR DEVICES

(71) Applicant: Ball Aerospace & Technologies Corp., Boulder, CO (US)

(72) Inventors: Joshua D. Funderburg, Erie, CO (US); Samuel Rivera, Westminster, CO (US); Cynthia G. Wallace, Louisville, CO (US)

(73) Assignee: BAE SYSTEMS SPACE & MISSION SYSTEMS INC., Broomfield, CO (US)

( * ) Notice: Subject to any disclaimer, the term of this patent is extended or adjusted under 35 U.S.C. 154(b) by 21 days.

(21) Appl. No.: 18/133,603

(22) Filed: Apr. 12, 2023

Related U.S. Application Data (60) Provisional application No. 63/331,383, filed on Apr. 15, 2022.

(51) Int. Cl.
  *G06F 1/24* (2006.01)
  *G06F 9/30* (2018.01)
  *G06F 9/4401* (2018.01)

(52) U.S. Cl.
  CPC ........ *G06F 9/30134* (2013.01); *G06F 9/4411* (2013.01)

(58) Field of Classification Search
  CPC .................................................. G06F 9/30134
  USPC ......................................................... 713/100
  See application file for complete search history.

(56) References Cited

U.S. PATENT DOCUMENTS

| | | | | |
|---|---|---|---|---|
| 6,643,081 B1* | 11/2003 | Walker | .................. | G11B 27/36 |
| 7,280,301 B1* | 10/2007 | Jackson | .................. | G11B 5/40 |
| 9,993,166 B1* | 6/2018 | Johnson | .............. | A61B 5/4806 |
| 2009/0063081 A1* | 3/2009 | Xu | .......................... | G01D 3/022 |
| | | | | 702/107 |
| 2011/0063634 A1* | 3/2011 | Boness | ............... | B41F 33/0081 |
| | | | | 358/1.9 |
| 2012/0194879 A1* | 8/2012 | Fu | .......................... | H04N 1/387 |
| | | | | 358/474 |
| 2014/0146185 A1* | 5/2014 | Kannermark | .......... | H04N 17/02 |
| | | | | 348/187 |
| 2015/0261161 A1* | 9/2015 | Waida | ................. | G03G 15/5029 |
| | | | | 399/45 |
| 2017/0317761 A1* | 11/2017 | Chen | ....................... | H04B 10/60 |
| 2019/0002227 A1* | 1/2019 | Zell | .................... | B65H 23/1882 |
| 2020/0150181 A1* | 5/2020 | Ray | .................. | G01R 31/31703 |

(Continued)

OTHER PUBLICATIONS

McInnes et al. "Umap: Uniform Manifold Approximation and Projection," Journal of Open Source Software, 2018, vol. 3, No. 29, 861, 2 pages.

(Continued)

*Primary Examiner* — Volvick Derose
(74) *Attorney, Agent, or Firm* — Sheridan Ross PC (57) ABSTRACT

Automated methods and systems for tuning parameters of detectors based on metrics are provided. The tuning methods and systems include using machine learning to adjust registers used for setting detector parameters in an automated fashion to achieve optimal performance in a time-efficient manner. The tuning process can include determining available registers provided by the detector and setting values within those registers to a starting value. A binary search in either direction from the starting value is then performed to determine the limits of the parameter values for each register. The register values can then be optimized in view of selected metrics.

20 Claims, 8 Drawing Sheets

(56) References Cited

U.S. PATENT DOCUMENTS

| | | | |
|---|---|---|---|
| 2020/0201889 A1* | 6/2020 | Viswanathan | G06F 16/2379 |
| 2021/0397481 A1* | 12/2021 | Jung | G06F 9/30167 |
| 2022/0132027 A1* | 4/2022 | Toizumi | G06N 3/067 |
| 2023/0210470 A1* | 7/2023 | Hill | A61B 5/02055 |
| | | | 600/301 |
| 2024/0183961 A1* | 6/2024 | Siessegger | G01S 7/497 |

OTHER PUBLICATIONS

Pearson F.R.S. "LIII. On Lines and Planes of Closest Fit to Systems of Points in Space," The London, Edinburgh, and Dublin Philosophical Magazine and Journal of Science, 1901, vol. 2, No. 11, pp. 559-572.

Van Der Maaten et al. "Visualizing Data using t-SNE," Journal of Machine Learning Research, 2008, vol. 9, pp. 2579-2604.

* cited by examiner

| | metric 1 | metric 2 | score | param 1 | param 2 | param 3 | param 4 | param 5 | param 6 | param 7 | param 8 | param 9 | param 10 | param 11 | param 12 | param 13 | param 14 | param 15 | param 16 | param 17 | param 18 | param 19 |
|---|---|---|---|---|---|---|---|---|---|---|---|---|---|---|---|---|---|---|---|---|---|---|
| Baseline | 1.10 | 0.87 | -0.23 | 255 | 3 | 5 | 10 | 16 | 18 | 0 | 18 | 20 | 0 | 7 | 47 | 5 | 8 | 7 | 159 | 164 | 176 | 40 |
| Agent | 0.75 | 0.98 | 0.23 | 250 | 2 | 2 | 8 | 10 | 22 | 9 | 22 | 22 | 1 | 12 | 51 | 4 | 9 | 6 | 159 | 161 | 179 | 45 |
| Agent | 0.86 | 0.97 | 0.11 | 253 | 1 | 7 | 9 | 18 | 14 | 11 | 16 | 21 | 1 | 11 | 48 | 6 | 6 | 6 | 162 | 165 | 177 | 42 |
| Agent | 0.86 | 0.97 | 0.11 | 254 | 2 | 2 | 7 | 17 | 23 | 8 | 23 | 20 | 10 | 14 | 47 | 4 | 5 | 9 | 163 | 169 | 177 | 35 |
| Agent | 0.86 | 0.96 | 0.10 | 254 | 1 | 6 | 7 | 10 | 21 | 5 | 24 | 22 | 3 | 10 | 42 | 5 | 5 | 5 | 162 | 163 | 174 | 37 |
| Agent | 0.87 | 0.97 | 0.10 | 246 | 2 | 7 | 8 | 13 | 19 | 10 | 19 | 17 | 12 | 12 | 42 | 6 | 4 | 7 | 165 | 164 | 170 | 38 |
| Simulation | | | -0.18 | 255 | 1 | 10 | 5 | 20 | 13 | 5 | 25 | 25 | 15 | 15 | 42 | 7 | 13 | 3 | 155 | 170 | 180 | 45 |

SYSTEMS AND METHODS OF TUNING SENSOR DEVICES

CROSS-REFERENCE TO RELATED APPLICATIONS

This application claims the benefit of U.S. Provisional Patent Application Ser. No. 63/331,383, filed Apr. 15, 2022, the entire disclosure of which is hereby incorporated herein by reference.

FIELD

Systems and methods for tuning sensor devices are provided.

BACKGROUND

Modern sensors, such as those used for satellite imagery, must be tuned to collect accurate data. Many sensors are tuned through the adjustment of parameters. Sensors may have any number, from one to hundreds, of parameters which may be tuned. Each parameter may be a number on a range. A range may be a scale such as from zero to one hundred for example. A parameter may be set at a precise number with any number of significant digits.

Tuning parameters of a sensor is a complex activity. Adjusting a single parameter may affect the performance of a sensor; however, to optimally tune a sensor, each parameter must be tuned in coordination with each other parameter. Because of the large number of parameters and the large number of options for each parameter, tuning a sensor manually or automatically using conventional methods is an excessively time consuming process.

Due to the prohibitive combinatorics involved, it would be computationally intractable to randomly search the entire parameter space for a sensor. Consider a case where a detector has 100 parameters to tune, where each parameter has three possible settings. Collecting a data sample for one parameter configuration, then storing it to disk for later analysis requires about one second, not including time for performing analysis. Such a detector would require reviewing over $3^{100}$ combinations, at $3.16 \times 10^7$ combinations per year, which amounts to over $10^{40}$ years.

Domain experts have developed processes to simplify the tuning process by experimenting with subsets of parameters in particular sequences that have been known to achieve good results. While the search is not exhaustive, it makes the problem tractable and has historically resulted in excellent performance. However, key drawbacks remain: (1) it requires several months of an expert's time, with very few people having the specialized knowledge necessary to execute the task; (2) the parameter search is not exhaustive and somewhat heuristic, meaning that devices could potentially reach better performance; and (3) the settings are fixed once tuned for a mission and must be re-tuned by an expert for alternative missions or use cases.

The current state of the art is hand-tuned devices. Engineers manually test and verify different parameter settings based on their expertise. Parameters must also be re-configured manually for new use cases and constraints.

SUMMARY

Embodiments of the present disclosure provide for a detector-optimization or tuning system to tune focal plane detector hardware. A tuning system as described herein addresses the problems of tuning focal plane detector hardware as well as other types of sensor devices. Such devices may have hundreds of free tuning parameters such as the integration time, the duration of time the detector is exposed to light, the voltage gains, and offsets, etc. Typically, trained domain experts manually tune each detector parameter to achieve performance based on mission relevant goals and specifications. This tuning requires years of domain training from existing experts, then six to eighteen-months manually tuning each detector. There is usually a massive time savings when tuning new similar devices, but new hardware typically requires the full tuning process.

In accordance with embodiments of the present disclosure, a tuning system for a sensor identifies a starting value for each of a plurality of registers, where each register contains a value for controlling a parameter associated with operation of the sensor, determines, for each register, an effective range of reasonable returns, determines, for each register, an optimal value within the effective range of reasonable returns, and sets each register to an optimal value. In some embodiments, the starting value may be manually set, such as by an engineer or other user. The process of determining the effective range of reasonable returns may comprise, for each register: leaving all registers in a starting configuration; binary searching upward to find an upper limit of reasonable returns; binary searching downward to find a lower limit of reasonable returns; saving a result as an effective register range; and returning to the starting configuration. The process of determining, for each register, the optimal value within the effective range may comprise, for a first set of registers associated with a first set of metrics, optimizing metrics of the first set of metrics, and setting a value for each register of the first set of registers to an optimal value. In some embodiments, setting each register to an optimal value comprises initializing each register to the determined optimal value within the effective range of reasonable returns; optimizing metrics over effective ranges; and setting registers to the optimal values.

A tuning system in accordance with embodiments of the present disclosure may be implemented by a computing system integrated or in communication with a detector comprising a sensor to be tuned. In embodiments described herein, the operation of tuning systems in accordance with embodiments of the present disclosure can be controlled through the execution of stored instructions or software by an on-board processor, autonomously or in connection with instructions or commands received from other computing systems. For example, and as described below, a computing system implementing a tuning system may be configured to receive sensor data or metrics associated with a sensor as well as parameter data such as may be stored in one or more registers. The computing system may be configured to, based on the received data, optimize the parameter data in such a way as to enable the sensor to operate in an optimal manner according to particular metrics.

Additional features and advantages of embodiments of the disclosed systems and methods will become more readily apparent from the following description, particularly when taken together with the accompanying drawings.

DETAILED DESCRIPTION

Figure 1:
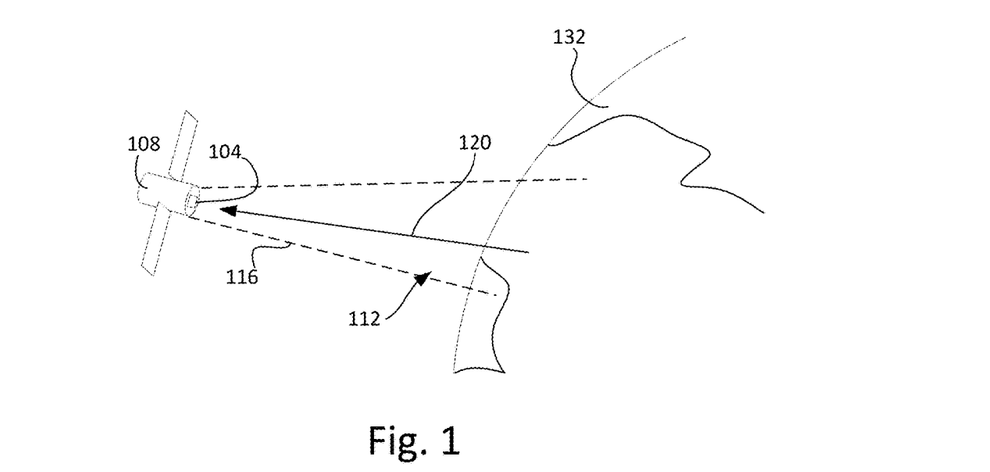
FIG. 1 depicts an example of a detector that can be tuned using systems and methods in accordance with embodiments of the present disclosure in a possible operating scenario.

As illustrated in FIG. 1, an example detector 104 that can be tuned using a tuning system as described herein may be deployed on a platform 108. The detector 104 may, for example, include a sensor which may enable the detector 104 to sense emissions and/or other detectable information from within an observation area 112 within a field of view 116 of the detector 104. As an example, the detector 104 can include an image sensor that collects light 120 received from within the field of view 116 and that produces images based on the collected light.

As depicted in FIG. 1, in an example operating scenario, the detector 104 is carried by a platform 108 in the form of a satellite in an orbit about the Earth 124 (such as a low Earth orbit (LEO)) in which the location of the platform 108 relative to the surface of the Earth 124 is continually changing. Although embodiments of the present disclosure can be particularly useful in connection with tuning a detector 104 that is carried by a satellite or that is otherwise, at least as a practical matter, inaccessible when in an operating environment, embodiments of the present disclosure are not so limited. Instead, embodiments of the present disclosure can be used to tune a detector 104 that is carried by or mounted to any type of platform 108 or vehicle, including but not limited to a balloon, aircraft, spacecraft, unmanned aerial vehicle, automobile, ship, or other mobile platform. As further examples, a detector 104 can be mounted to a building, tower, or tripod. As yet another example, a detector 104 can be hand carried.

As referenced above, a detector 104 may include a sensor. The tuning systems and methods described herein may be implemented in relation to detectors 104 including one or more of any types of sensors, such as optical sensors, e.g., image sensors, LiDAR systems, etc., inertial sensors (e.g., accelerometers, gyroscopes, etc., temperatures sensors, pressure sensors, gas sensors, magnetic sensors, etc.

Operators of a detector 104 may require particular levels of performance. For example, a detector 104 including an image sensor may be demanded upon by users to provide excellent image quality based on factors such as low-light performance, optimal depth-of-field, reduced motion blur, improved dynamic range, etc.

To enable the sensor of the detector 104 to perform at an optimal level, a large number of parameters may need to be adjusted. As used herein, a parameter is a control variable that affects at least one aspect of the operation of a detector 104 and that can be set to a selected value. In accordance with at least some embodiments of the present disclosure, a parameter value can be selected from within a range of possible values and is set by entering the selected value in an associated register. For example, for an image sensor, parameters such as exposure time, sensitivity, aperture size, focus distance, frame rate, image resolution, spectral range, gain, offsets, etc., may need to be adjusted. Moreover, some or all of these parameters may need to be selected on an individual basis for each of a large number of pixels. For inertial sensors, for example, parameters such as sampling rate, measurement range, sensitivity, noise density, filter settings, etc., may need to be adjusted. As should be appreciated, the adjustment of parameters is a labor-intensive process. Adjusting each single parameter affects the overall performance of the detector 104, thus the parameters must be tuned together to obtain optimal performance. Such hardware and devices may have hundreds or more of free-tuning parameters.

Using conventional methods, trained domain experts are required to manually tune each detector 104 parameter to achieve performance based on mission-relevant goals and specifications. Such tuning often requires years of domain training from existing experts, then six to eighteen months of manually tuning each instance of the detector 104. While time savings may be found when tuning new similar devices, new hardware typically requires an extensive and time-consuming tuning process.

While conventional tuning processes require users such as engineers to manually test and verify different parameter settings based on their expertise, in accordance with the systems and methods described herein, a detector 104 may be automatically tuned, either prior to deployment or during deployment, using an automated tuning system. Such a tuning system may enable the sensor or sensors of the detector 104 to be configured such that the detector 104 captures data accurately and efficiently, without requiring manual tuning from users. Using a tuning system or method as described herein, a user, such as an engineer, may be enabled to select a high-level tuning plan for a detector 104. The tuning may next be automatically, without requiring further input from a user, executed by an intelligent agent process executing on a computing device internal to, or in communication with, the detector 104. Accordingly, tuning systems and methods in accordance with embodiments of the present disclosure enable a device such as a focal plane detector, or any other type of detector including a sensor or other tunable device, to be tuned quickly and accurately.

While not illustrated in FIG. 1, the detector 104 may comprise or be in communication with a computing system configured to perform an automated tuning of the detector 104 in accordance with the systems and methods described herein.

Figure 2:
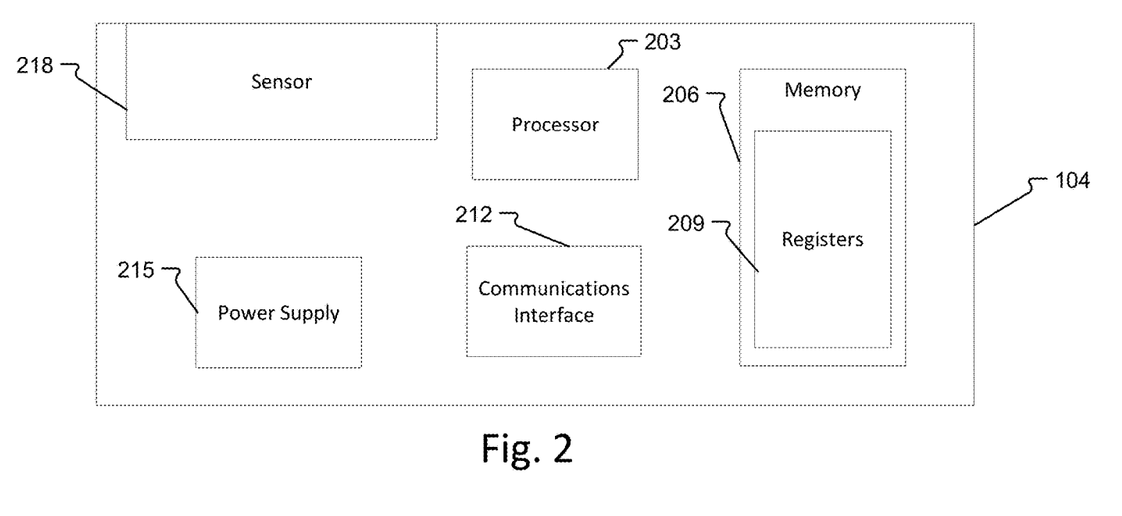
FIG. 2 is a block diagram of a detector that can be tuned using systems and methods in accordance with one or more embodiments of the present disclosure.

For example, in some embodiments, a detector 104 may be as illustrated in FIG. 2 and may comprise a sensor 218 which may be configured to output data based on a stimulus. The detector 104 may, for example, be configured to output an image, or other format of data, based on data output by the sensor 218.

The systems and methods described herein may be implemented to fine-tune detectors 104 including a wide variety of sensors. For example, a sensor 218 of a detector 104 may be one or more different types of sensors, such as, but not limited to, temperature sensors which measure the temperature of a physical object or environment, light sensors which measure the amount of light in an environment, motion sensors which detect movement or changes in position, proximity sensors which detect the presence or absence of objects in close proximity to the sensor, pressure sensors which measure the pressure of a gas or liquid, humidity sensors which measure the amount of moisture in the air, magnetic sensors which detect changes in magnetic fields, accelerometers which measure acceleration and changes in velocity, gyroscopes which measure rotational motion and orientation, optical sensors which detect light or changes in light levels, infrared sensors which detect infrared radiation, ultrasonic sensors which use high-frequency sound waves to measure distances or detect objects, etc.

The sensor 218 of the detector 104 being tuned may be associated with a plurality of parameters. Because sensors 218 and detectors 104 may be used to measure various physical and environmental phenomena, the types of parameters associated with a sensor or detector can vary widely depending on the specific application. Based on data output by the sensor 218, one or more metrics may be used to determine a quality of the function of the detector 104.

The values associated with the various parameters of a sensor or detector 104 may be stored in registers 209 in memory 206 of the detector 104 or as part of a computing or other system in communication with the detector 104. Each parameter may be associated with a particular register 209 in which a value for the parameter is stored. Each parameter may be identified using a parameter ID and the value for the parameter may be a numerical value stored in memory 206. Adjustment of the parameters may comprise editing values stored in the registers 209.

For a given detector 104, one or more parameters may be associated with a particular register 209 stored in memory 206. Each register 209 may be set to a value which may affect the associated parameter. By setting a register 209 to a particular value, the associated parameter may be adjusted to the value.

As described herein, and in particular in relation to the methods illustrated in FIGS. 8-10 and described below, methods may be performed to optimize and fine tune register values associated with parameters based on metrics. While the systems and methods described herein are associated with register-based devices such as detectors arrays, it should be appreciated the same or similar methods and systems may be used to train any type of device comprising a sensor. As described herein, systems and methods may comprise algorithms and software tools that automate the device tuning process.

In some embodiments, in addition to a sensor 218, a detector 104 may also comprise one or more power supply units 215, one or more processor 203, and a communications interface 212.

In some embodiments, the processor 208 of a detector 104 can include one or more general purpose programmable processors, graphics processing units (GPUs), vector processors, array processors, field programmable gate arrays (FPGA), controllers, or other processing device or set of devices capable of executing instructions for operation of the detector 104, including operation and control of the sensor 218 as described herein. The instructions executed by the processor 208 can be stored as application programming in the memory and/or data storage 206.

The memory and/or data storage 206 can include one or more volatile or nonvolatile solid-state memory devices, such as but not limited to RAM, SDRAM, one or more mass storage devices, such as, but not limited to, a hard disk drive, an optical storage device, a solid-state drive, or the like. In addition to providing storage for the application programming and parameters, the memory and/or the data storage 206 can store intermediate or final data products, such as frames of image data and aggregate images, or other data or reference information. The memory and/or the data storage 206 can also store location and location reference information in the form of an object catalog database, navigational information, and image data. In addition, the memory and/or data storage 206 can store detector performance parameter data.

The detector 104 may in some embodiments further include a power supply 215, such as a battery or other power source. The power supply 215 may be capable of providing sufficient power to enable the components and features of the detector 104 to execute the systems and methods described herein.

The communications interface 212 of the detector 104 may be, for example and without limitation, one or more communications transmitters and receivers utilizing radio frequency or light-based signaling methodologies. The communications interface 212 of the detector 104 can operate to transmit data collected by the detector 104 to a ground station or to communications interfaces 306 on other platforms such as a computing system 300 as described below in relation to FIG. 3. The communications interface 212 of the detector 104 can also operate to receive operational instructions or updates in connection with the operation of the detector 104. Alternatively, or in addition, the communications interface 212 can interconnect the detector 104 to a tuning system in accordance with still other embodiments of the present disclosure.

Figure 3:
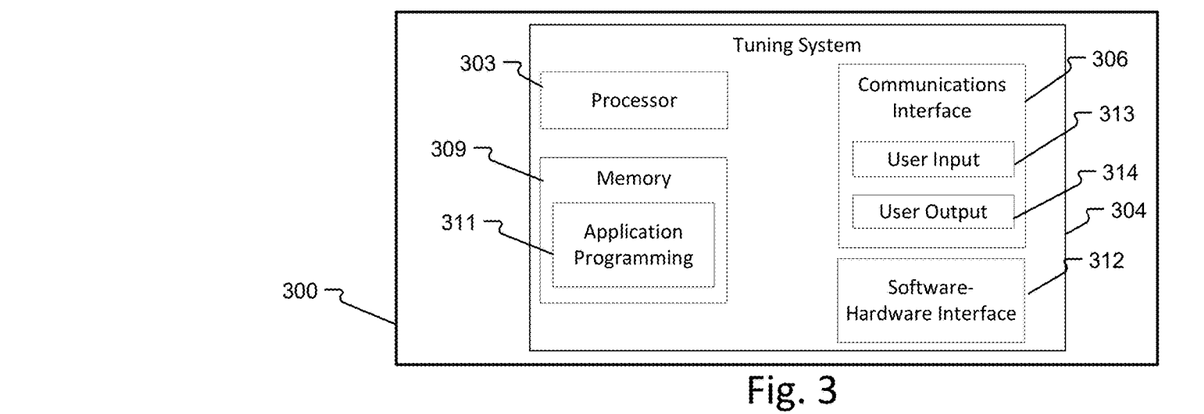
FIG. 3 is a block diagram of a computing system implementing a tuning system in accordance with one or more embodiments of the present disclosure.
Figure 4:
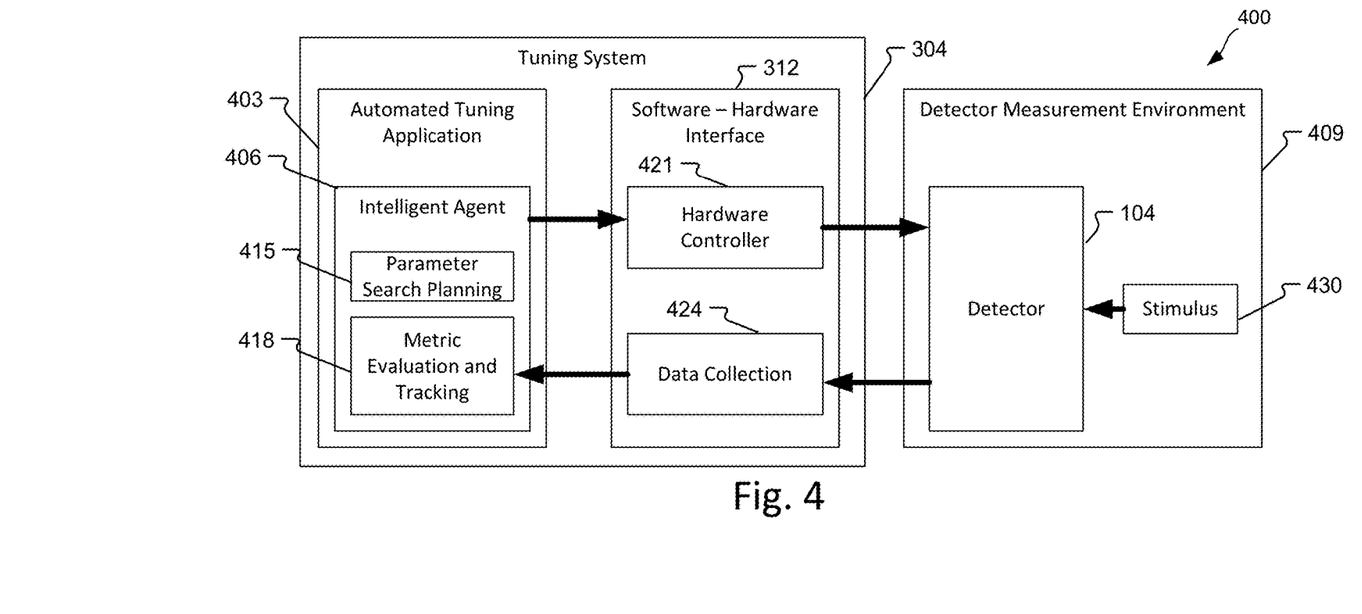
FIG. 4 is a block diagram of a tuning system operatively connected to a detector in accordance with one or more embodiments of the present disclosure.

FIG. 3 is a block diagram depicting elements of a computing system 300 implementing a tuning system 304, illustrated in FIG. 4, in accordance with at least some embodiments of the present disclosure. In general, the computing system 300 includes a processor 303, memory and/or data storage 309, a communications interface 306, and a software-hardware interface 312.

The processor 303 of the computing system 300 can include one or more general purpose programmable processors, graphics processing units (GPUs), vector processors, array processors, field programmable gate arrays (FPGA), controllers, or other processing device or set of devices capable of executing instructions for operation of the detector 104, including operation and control of parameters associated with the sensor 218 as described herein. The instructions executed by the processor 303 can be stored as application programming 311 in the memory and/or data storage 309. Moreover, the application programming 311 can include an automated tuning application 403, as discussed in greater detail elsewhere herein.

The memory and/or data storage 309 can include one or more volatile or nonvolatile solid-state memory devices, such as but not limited to RAM, SDRAM, one or more mass storage devices, such as, but not limited to, a hard disk drive, an optical storage device, a solid-state drive, or the like. In addition to providing storage for the application programming 311, the memory and/or the data storage 309 can store intermediate or final data products generated by the sensor 218 and/or the detector 104, such as frames of image data and aggregate images, or other data or reference information. In addition, the memory and/or data storage 309 can store detector 104 performance parameter data.

The communications interface 306 may comprise, for example, one or more user input 313 and/or user output 314 systems. A user input 313 system may be capable of accepting input from a user such as via a keyboard, mouse, touchscreen, buttons, etc. Using the user input 313, a user may be enabled to provide instructions to control or modify the control of the automated tuning system. A user output 314 system may be capable of providing information to a user, such as via a display device. For example, a user interface may be displayed on a display device via the user output 314. A user interface may be used to provide information or feedback to a user. The information or feedback provided to a user may be in the form of training data, parameter settings, or visualization tools enabling a user to view data relating to tuning.

FIG. 4 depicts a tuning environment 400 in which a tuning system 304 is interconnected to a detector 104. In some embodiments, the processor 303 of the computing system 300 illustrated in FIG. 3 may be configured to execute a tuning application 403. In some embodiments, the tuning application 403 may be executed by a processor 203 onboard a detector 104 as illustrated in FIG. 2. In still other embodiments, the tuning application 403 can be executed cooperatively by the processor 303 of the computing system 300 implementing the tuning system 304 and the processor 203 included as part of the detector 104 being tuned.

The tuning application 403 may be capable of implementing methods of auto-tuning a detector 104 using one or more intelligent agents 406. As discussed elsewhere herein, an intelligent agent 406 can be configured as or can include one or more artificial intelligence (AI) or machine learning (ML) models. For example, the processor 303 may be configured to provide configuration data, such as parameter values, to the detector 104, and to receive parameter values and/or sensor data from the detector 104, via an operative connection between the communications interface 306 of the tuning system 304 and the communications interface 212 of the detector 104. More particularly, through execution of the automated tuning application 403, the processor 303 may be capable of performing one or more of the methods as described herein, such as those illustrated in FIGS. 8-10.

The software-hardware interface 312 of the computing system 300 illustrated in FIG. 3 may, as illustrated in FIG. 4, implement a hardware controller 421, which may be used to transmit instructions from an intelligent agent 406 of the automated tuning application 403 executed by the processor 303 of the computing system 300 to a communications system 212 of a detector 104 as illustrated in FIG. 2. A data collection function 424 of the software-hardware interface 312 may transfer data, such as sensor data collected from a stimulus 430 and/or parameter settings such as may be stored in registers 209 in memory 206 of the detector 104, from the detector 104. The data collections function 424 may be configured to provide such data to a tuning system 304 executed by the processor 303 of the computing system 300.

As shown in FIG. 4, a feedback cycle can be established between an intelligent agent 406 of an automated tuning application 403 executed by a processor 303 of a computing system 300 implementing the tuning system 304 and a detector 104 in accordance with at least one embodiment. The feedback cycle can include the software-hardware interface 312 being used to programmatically control hardware parameters of the detector 104 by relaying parameter values determined through the execution of the automated tuning application 403 to the detector 104. Data from the detector 104, including but not limited to possible configuration values, current configuration values, and sensor output data, can be retrieved through the software-hardware interface and returned to the tuning system 304 for use by the automated tuning application 403. Data processing routines, executed by the intelligent agent 406 implemented using the automated tuning application 403, including metric evaluation and tracking 418, may be used to calculate metrics from the data received from the detector 104. The intelligent agent 406 may use feedback generated by the metric evaluation and tracking 418 routine to determine new parameter sets to explore using a parameter search planning subsystem 415, and/or to adjust the parameter values provided from the tuning system 304 to configure the detector 104.

The hardware controller 221 may be configured to sample data from the detector 104. In some embodiments, sampling data from the detector may be performed as parameters of the detector 104 are adjusted, such as over a particular parameter space for a subset of parameters of interest. In some embodiments, sampled data may be used as an offline dataset for algorithm development and evaluation. In this way, a simulated environment may be built using prior data, or newly collected data. As should be appreciated, the detector 104 may be in a detector measurement environment 409, which may be a physical environment in which the detector 104 is deployed, such as on a platform 108 as illustrated in FIG. 1, or in a simulated environment in which prior data is provided to the detector 104 via a stimulus 430. The stimulus 430 may be, for example, based on real-word data collected by a sensor of the detector 104 from a physical environment or prior data provided to the detector 104. For example, the stimulus 430 may be provided to the detector 104 in the form of a hardware simulator.

Using a feedback cycle as illustrated in FIG. 4, a user seeking to tune parameters of the detector 104, or other type of sensor or device, may be enabled to automatically tune the detector 104 based on any metrics of interest. The user may determine the metrics of interest based on past collected data, e.g., by exploratory data analysis of past collected data or based on intended use of the detector 104. Based on the metrics of interest, the automated tuning application 403 may execute an intelligent agent 406 to perform a method automatically perform tuning the detector 104. Such a method of automatically tuning the detector 104 may be as described below in relation to FIGS. 8-10.

Figure 5:
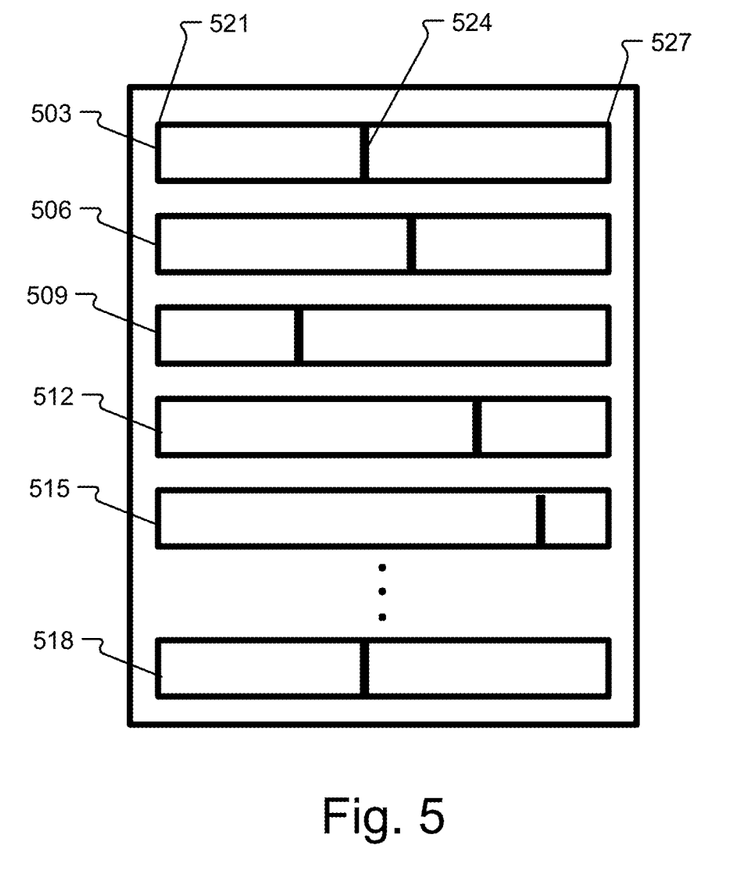
FIG. 5 is an illustration of registers in accordance with one or more embodiments of the present disclosure.

As illustrated in FIG. 5, a detector 104 to be tuned may be associated with a plurality of registers 503, 506, 509, 512, 515, 518. Each register 503, 506, 509, 512, 515, 518 may be associated with an operating parameter of the detector 104 and can hold a value in the form of a number. Each register 503, 506, 509, 512, 515, 518 may be associated with a minimum value 521, a maximum value 527, and an initial value or starting point 524. The starting point may be set manually by an operator such as an engineer. As described above, each register 503, 506, 509, 512, 515, 518 may contain a value associated with a parameter of a sensor of the detector 104 to be tuned.

As described above, a detector 104 may be associated with a large number of parameters that may need to be adjusted. For example, for a detector 104 in the form of an image sensor, parameters such as exposure or integration time, sensitivity, gain, aperture size, focus distance, frame rate, image resolution, spectral range, etc., may need to be adjusted. For a detector 104 in the form of inertial sensors, for example, parameters such as sampling rate, measurement range, sensitivity, noise density, filter settings, etc., may need to be adjusted. As should be appreciated, the adjustment of detector 104 parameters is a labor-intensive process. Adjusting each single parameter affects the overall performance of the detector 104, thus the parameters must be tuned together to obtain optimal performance.

Each parameter may be associated with a value stored in a register 503, 506, 509, 512, 515, 518. Each parameter may be associated with a metric. As should be appreciated, various metrics can be used to evaluate the performance of a sensor of a detector 104 as different parameters are adjusted. The metrics used to evaluate a sensor's performance may depend on the type of sensor and the specific application requirements. As an example, metrics used may include one or more of accuracy, resolution, sensitivity, linearity, response time, hysteresis, signal-to-noise ratio (SNR), stability, dynamic range, robustness, etc. Accuracy may be a measurement of how close the sensor's output is to the true value or a reference value. Resolution may be an indication of the smallest detectable change in the measured variable that the sensor can reliably detect. Sensitivity may be an indication of the ratio of the change in sensor output to the change in the input. Linearity may indicate the degree to which the sensor's output is proportional to its input over the entire measurement range. Response time may be an indication of the time taken by the sensor to respond to a change in a measured variable. Hysteresis may be an indication of difference in sensor output for a given input value when the input is approached from different directions (increasing or decreasing). SNR may be an indication of the ratio of the signal level to the noise level in the sensor's output. Stability may be an indication of the ability of a sensor to maintain consistent performance over time, typically measured as drift or aging. Dynamic range may be an indication of the range of input values over which the sensor can operate with acceptable performance. Robustness may be an indication of The ability of a sensor to maintain its performance under challenging or adverse conditions, such as extreme temperatures, humidity, or mechanical stress.

By evaluating such metrics as different parameters of a detector 104 are adjusted, the automated tuning system 304 as described herein can optimize sensor performance for a specific application and ensure that the detector 104 meets desired performance criteria.

Each register may have different upper and lower limit values. Furthermore, the tuning approaches described below may in some instances require register values of the different parameters to be tuned to be on the same scale. In some embodiments, an interface that automatically scales register settings from a particular range of values, e.g., zero to one, to another range of values, such as may be specified in a configuration file may be implemented.

Figure 6A:
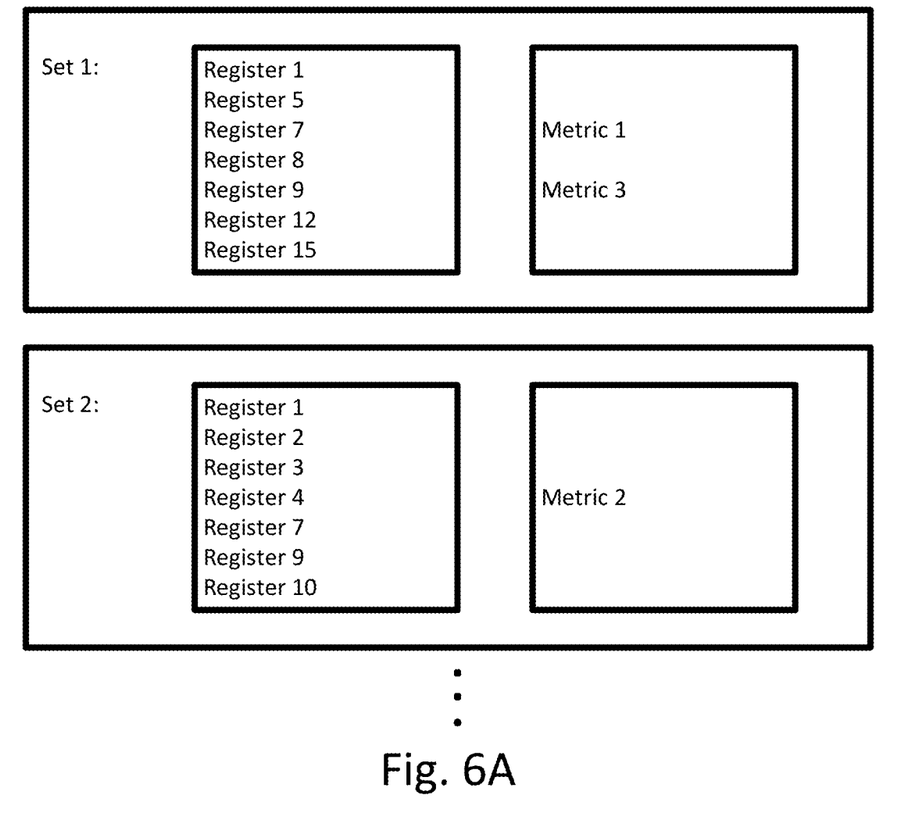
FIGS. 6A and 6B are illustrations of an algorithm in accordance with one or more embodiments of the present disclosure.

As illustrated in FIG. 6A, each of the registers for a detector 104 to be tuned may be associated with one or more metrics. Adjusting a particular parameter associated with a register may have an effect on one or more metrics and may not have an effect on one or more other metrics. Subsets of registers may be identified in which each register of a subset is associated with one or more common metrics. Adjusting the parameters associated with any one of the registers in a particular group will affect the metric or metrics with which the group is associated. For example, as illustrated in FIG. 6A, registers 1, 5, 7-9, 12, and 15 are associated with metrics 1 and 3, and registers 1-4, 7, 9, and 10 are associated with metric 2. Adjusting any one or more of the parameters stored in registers 1, 5, 7-9, 12, and 15 will have an effect on metric 1 and on metric 3. Adjusting any one or more of the parameters stored in registers 1-4, 7, 9, and 10 will have an effect of metric 2.

Determining that a particular register, i.e., a particular detector 104 parameter controlled at least in part by a value held in a particular register, is associated with a particular metric may comprise determining that an adjustment to the particular register has an effect on the metric based on the output of the detector 104. For example, adjusting register 2 may affect a metric 2 but not a metric 1 and 3, and adjusting register 1 may affect metrics 1, 2, and 3. As such, register 1 may be in a first subset with registers which affect metric 1, a second subset with registers which affect metric 2, a third subset with registers which affect metric 3, a fourth subset with registers which affect metrics 1 and 2, a fifth subset with registers which affect metrics 1 and 3, a sixth subset with registers which affect metrics 2 and 3, and a seventh subset with registers which affect metrics 1, 2, and 3. Register 2 may be only in the second subset.

Figure 6B:
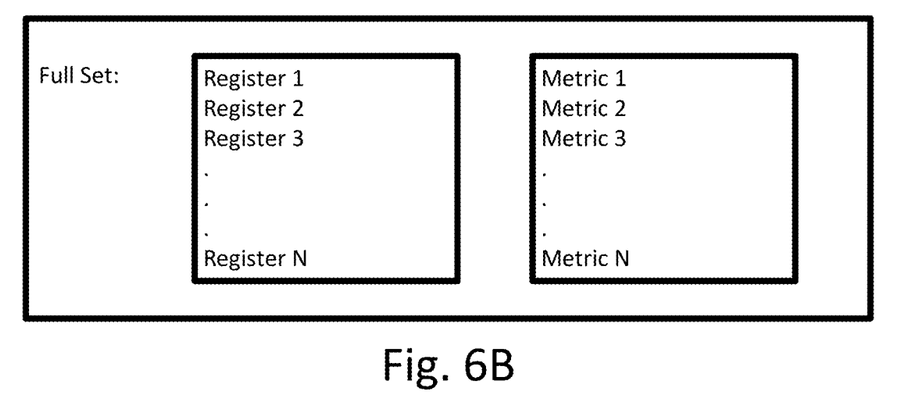

As illustrated in FIG. 6B, a detector 104 to be tuned may be associated with a full set of registers 1-N and a full set of metrics 1-M which may be used to determine the quality of tuning. The full set of registers includes all registers containing a parameter that affects any metric of the metrics which affect the performance of the detector 104. The full set of metrics includes all metrics that affect the performance of the detector 104. It should be appreciated that certain metrics that may be measured for a given detector 104 may be irrelevant when assessing the performance of the detector 104. Such metrics may not be in the full set of metrics as described herein.

The detector 104 may be controlled through the adjustment of parameters or other adjustable elements or variables. In some cases, a detector 104 may be associated with a subset of parameters which may be found to be more critical. For example, out of one hundred parameters that may be associated with a detector 104, only ten to twenty may be found to be more critical. In such cases, the intelligent agent 406 may be configured to adjust only the more critical parameters. In some embodiments, more critical parameters may be selected by a user, while in some embodiments, the intelligent agent 406 may be configured to automatically identify which parameters are more critical.

One benefit of the systems and methods described herein is that a trained model may be used as a surrogate for hardware when evaluating agents. In this way, an automated tuning application 403 may be tested to verify whether the intelligent agent 406 tuning the simulated hardware would find the best settings or parameter values obtained through a systematic search of the register space. In some embodiments, kernel ridge regression may be used to build a regression model relating register values to associated score values. A Bayes agent or other intelligent agent 406 implemented by the automated tuning application 403 may be used to search the space and show the result of the best register settings such as those illustrated in FIG. 7. The results show the agent looking to the extremes of parameter values which suggests that the learned model is extrapolating beyond the explored parameter ranges.

Figure 7:
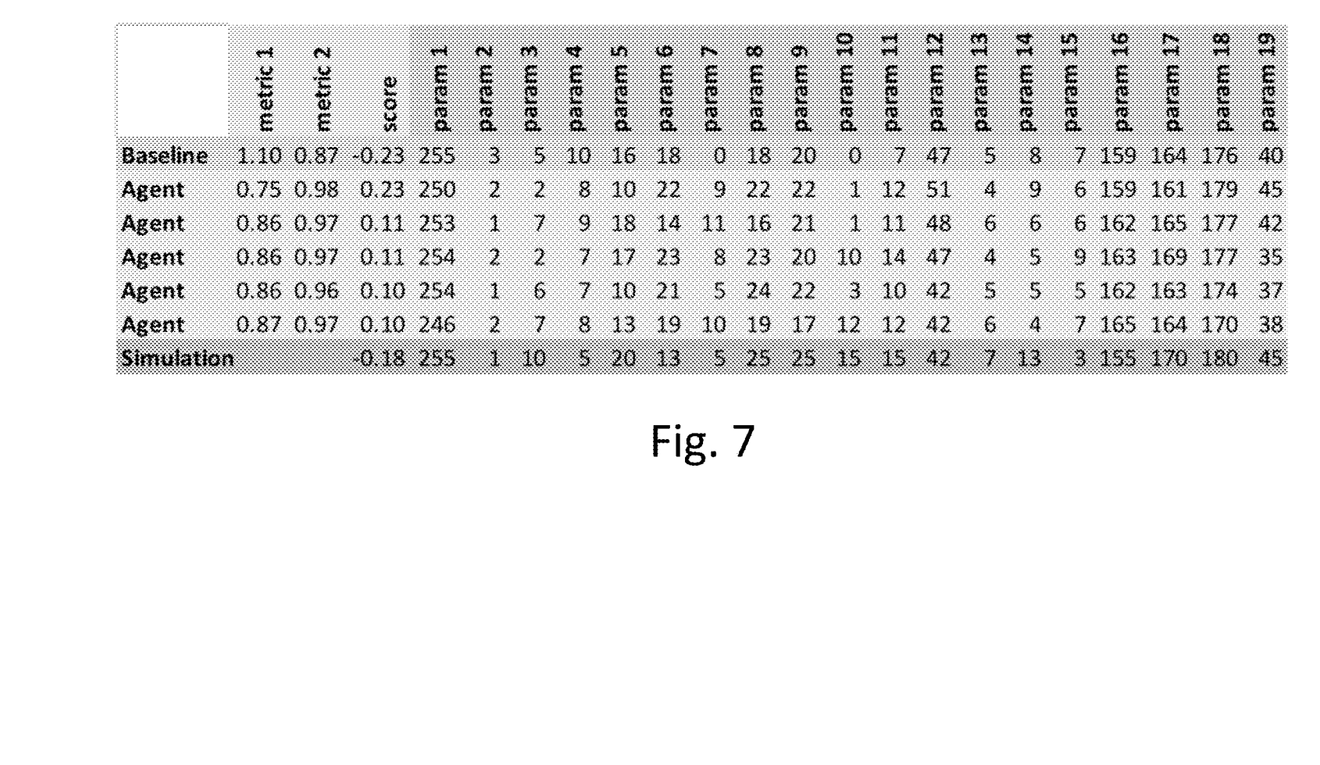
FIG. 7 is a table of metric results and scores based on parameters in accordance with one or more embodiments of the present disclosure.

As illustrated in FIG. 7, a plurality of values of parameters of a detector 104, such as may be stored in registers 209 in memory 206 of the detector 104, may be tuned by a plurality of intelligent agents 406 implemented by an automated tuning application 403 which may be executed by a processor 303 of a computing system 300. In the example illustrated in FIG. 7, the detector 104 being tuned comprises nineteen parameters, i.e., parameters 1-19, and the optimality of the tuning is evaluated by two metrics, i.e., metric 1 and metric 2. A score may be generated by adding or subtracting the metric values or may be otherwise based on the values of the metrics. In the example of FIG. 7, a score is created by subtracting metric 1 from metric 2.

FIG. 7 illustrates baseline settings and metric results along with five register settings, each found by an intelligent agent 406 implemented by an automated tuning application 403 such as may be executed by a processor 303 of a computing system 300. In the example illustrated in FIG. 7, the score improves as metric 1 is reduced and metric 2 is increased. Each of the parameters listed in a row for a particular intelligent agent 406 may have been individually adjusted by the respective intelligent agent 406 using a tuning process, such as using a method as described below in relation to FIGS. 8-10. After the parameters are adjusted by an intelligent agent 406, the metrics may be evaluated, and a score may be generated. Evaluation and scoring may be completed automatically by, for example, a processor 303 of a computing system 300 implementing a tuning system 304 as disclosed herein. As should be appreciated, of the five intelligent agents, a first intelligent agent scored highest by improving a first metric, metric 1, from 1.1 to 0.75, and a second metric from 0.87 to 0.98, improving the score from −0.23 to 0.23.

After parameters for a detector 104 are tuned by the tuning system 304 using a process as described herein, the parameters of the detector 104 may be updated to match the tuned parameters as determined using an intelligent agent 406. For example, a configuration file may be generated by the tuning system 304 and sent via a communications interface 306 of the computing system 300 to the detector 104 via a communications interface 212 of the detector 104.

In the following description, a series of three methods for adjusting parameters to optimize performance of a detector are described and illustrated in FIGS. 8-10. The three methods may be implemented together to tune a detector by optimizing a set of parameters for the detector.

Figure 8:
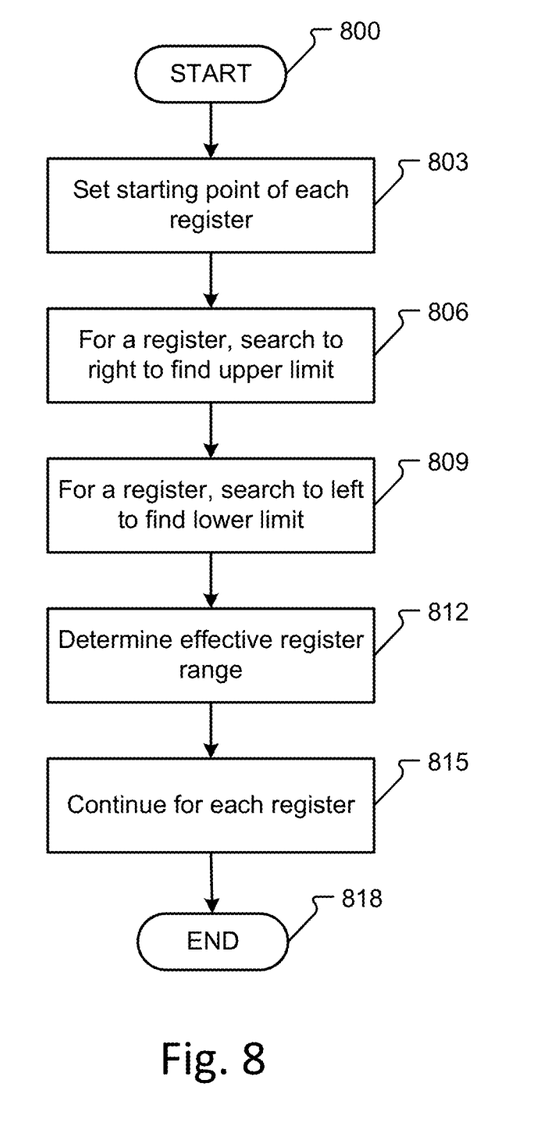
FIGS. 8-10 are flowcharts of methods in accordance with one or more embodiments of the present disclosure.
Figure 9:
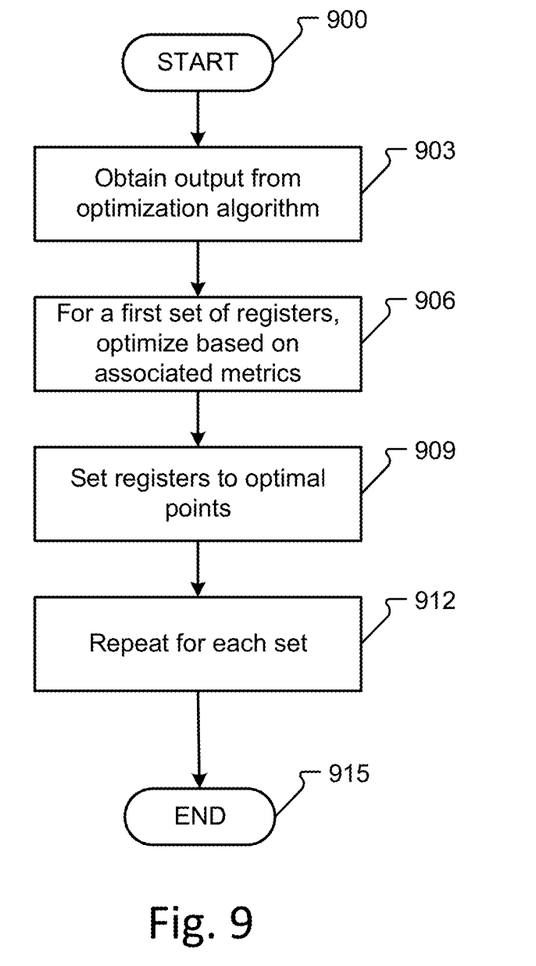
Figure 10:
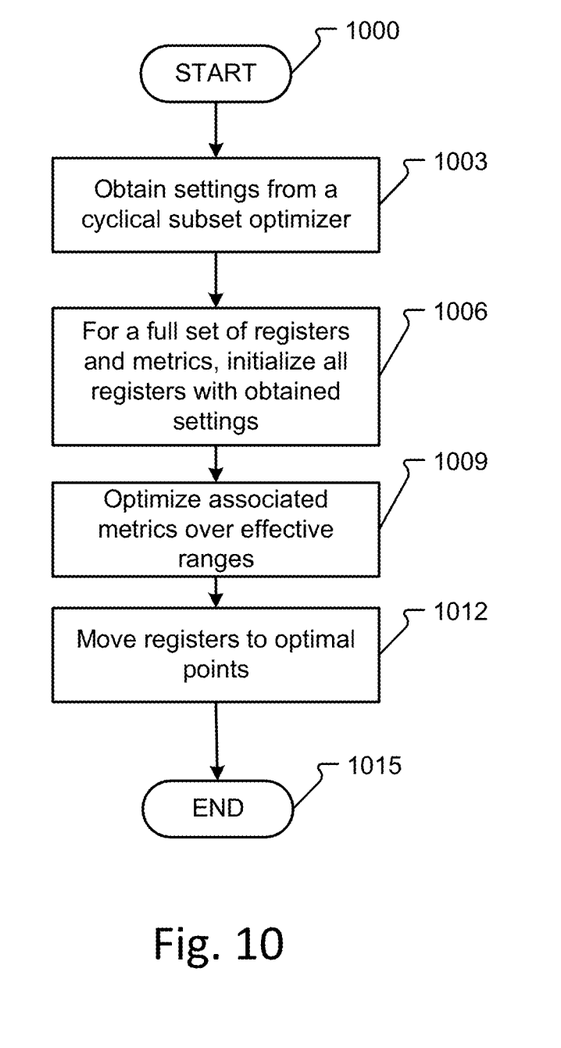

In some embodiments, the tuning methods described in relation to FIGS. 8-10 may be implemented by placing a detector 104 to be tuned in a physical or simulated environment 409 and initializing the detector 104 with initial parameter settings. The initial parameter settings may be, for example, parameter values determined to be reasonable, such as, for example, by an engineer or other user, default initial values, or zero values. Such settings may provide reasonable—but not optimal—detector performance, without requiring extensive parameter exploration by the engineer. At the beginning of the tuning process, data may be collected prior to changing register settings. For example, the detector 104 to be tuned may be used to collect one or more images or other forms of data points. Such data may serve as a baseline for providing a comparison against parameter settings determined by one or more intelligent agents 406. Next, one or more intelligent agents may explore the parameter space around the initial parameter settings.

In the method illustrated in FIG. 8, as described in greater detail below, for each parameter, an effective range of register values is identified. The tuning method of FIG. 8 may be described as a register range finder. The method of FIG. 8 is an approach to specifying parameter limits automatically, with computational complexity of order O(log n), where n is the number of elements in the list, in the asymptotic sense. A range for a particular parameter comprises a high value, or upper limit, and a low value, or lower limit. Parameter values below the lower limit or above the upper limit for a particular parameter may be determined based on a determination that the output of the detector 104 is outside an appropriate range when set to such extreme values. By determining the upper and lower limits for each parameter, an effective parameter range can be used to lower the complexity of the tuning which continues in the methods illustrated in FIGS. 9 and 10. This method of FIG. 8 may be referred to as an optimization algorithm.

As described above, a detector 104 or sensor may be associated with a number of parameters. Each parameter may be associated with one or more values stored in memory 206 of the detector 104. These values may be stored in the form of registers 209. Each register 209 may be associated with a parameter ID and a register value. Tuning the detector 104 may comprise editing the register values for each parameter to an optimal value.

The process of tuning a detector 104 can begin with identifying the effective range or register values associated with each parameter. As illustrated in FIG. 8, a method of identifying effective ranges of registers may begin at 800 at which point a detector 104 to be tuned may be associated with a plurality of parameters which may be used to adjust the performance of the detector 104. The detector 104 may be in communication with a computer system executing an intelligent agent as described above.

At 803, each parameter may be set to an initial value or starting point. The initial value for each parameter may be set by a user or may be a default value set by a manufacturer or other entity associated with the detector being tuned.

Setting the parameter to the initial value may be performed automatically by pulling data from a configuration file or other source. In some embodiments, the parameters may be set to an initial value manually by enabling a user to adjust values through a user interface. For example, initial values for the parameters may be adjusted by a user depending on circumstances or particular goals of the user.

In some embodiments, the initial value may automatically be set to one of a midpoint, a zero value, a minimum value, or a maximum value. As illustrated in FIG. 5, each parameter may comprise an upper limit and a lower limit. In some embodiments, initial values may be set based on past performance or optimal settings for similar detectors.

At 806, an intelligent agent 406 of a tuning system 304 may perform a binary search from a starting point of a first parameter to find an upper limit of reasonable returns. A binary search is a searching algorithm capable of finding the position of a target value within a sorted list or array. The binary search algorithm works by repeatedly dividing the list in half and choosing the half that contains the target value, until the target value is found, or it is determined that the target value is not in the list.

A binary search for the first parameter may begin by first determining an upper limit of reasonable returns. The upper limit may be a value of the first parameter at which point an output of the detector becomes unacceptable.

An acceptable range of the detector output may be determined based on one or more metrics or may be determined based on input from a user. For example, with all other parameter values at an initial value, the first parameter may be swept from a low value to a high value, or vice versa. At intervals or continuously, an output of the detector 104 being tuned may be evaluated. Upon the output reaching an unacceptable level, such as based on one or more metrics, the value of the parameter at the unacceptable level may be determined to be out-of-range. By sweeping through all possible values, a range, including an upper and lower limit, for the parameter may be determined.

The binary search may be conducted by first considering the initial value or starting point of the first parameter. If the detector 104 output when the first parameter—and all other parameters—is at the initial value is within the acceptable range, the first parameter can be stepped up an increment. This process can continue until the detector output becomes outside the acceptable range.

The binary search algorithm is efficient because it eliminates half of the remaining elements with each iteration, reducing the number of elements that need to be searched. This makes the binary search algorithm much faster than a linear search, which examines every element in the list one by one. The binary search algorithm has a time complexity of O(log n), where n is the number of elements in the list, making it an efficient algorithm for large lists or arrays.

After finding the maximum value or upper limit for the first parameter, at 809 the intelligent agent 406 may perform a binary search from the starting point of the first parameter to find a lower limit of reasonable returns. The binary search for the lower limit may be conducted by first considering the initial value or starting point of the first parameter. If the detector output when the first parameter—and all other parameters—is at the initial value is within the acceptable range, the first parameter can be stepped down an increment. This process can continue until the detector output becomes outside the acceptable range.

At 812, based on the upper and lower limits of reasonable returns for the first parameter, the intelligent agent 406 may determine an effective range for the first parameter is from the lower limit to the upper limit of reasonable returns. The intelligent agent may save the resulting range as the effective parameter range for the first parameter.

At 815, the first parameter may be reset to the initial value or starting point, the starting configuration for the first register, and the method may be repeated for a second register. The method may continue until an effective range is determined for each parameter. The method may end at 818.

In the method illustrated in FIG. 9, the resulting ranges of FIG. 8 may be used to determine, for a plurality of sets of parameters, optimal values based on particular metrics. In effect, instead of fine-tuning the entire system based on all metrics simultaneously, different sets of parameters may be fine-tuned to meet particular metrics associated with the parameters of the set of parameters. For example, as illustrated in FIG. 6A, each register containing a parameter value may be grouped with other registers containing other parameters. The registers in each group may be determined by determining which parameters affect each metric as described above in relation to FIG. 6A. This method of FIG. 9 may be referred to as a cyclical subset optimizer.

As illustrated in FIG. 9, a method of optimizing register values may be performed. The method of FIG. 9 may be described as a cyclical subset optimizer. In the method of FIG. 9, the registers to be tuned may be received from a device specialist.

The cyclical subset optimizer as described herein is useful for optimizing problems with a large number of parameters or variables, as it allows the tuning process to be divided into smaller, more manageable parts. This makes the cyclical subset optimizer well-suited for problems where the tuning process is computationally intensive and where a traditional optimization algorithm would take too much time to converge to the optimal solution.

The method illustrated in FIG. 9 may begin at 900 in which an optimal value for each parameter in a set of parameters may be determined. The metrics to be tuned may also be known, as well as which parameter is associated with which metric, for example as illustrated in FIG. 6A. For example, the parameters may be associated with one or more sets or groups based on which metrics are affected by each parameter.

As illustrated in FIG. 9, the method may comprise, at 903, obtaining an output from the optimization algorithm described above in relation to FIG. 8 to determine an effective range for each parameter. The output from the optimization algorithm described above in relation to FIG. 8 may comprise a list of parameters along with a minimum effective value and a maximum effective value for each parameter.

A cyclical subset optimizer as described herein in relation to FIG. 9 may be a meta-heuristic optimization algorithm used to find the optimal register values to meet desired metrics by iteratively exploring different subsets of the parameters or variables. The cyclical subset optimizer works by dividing the full set of parameters into smaller subsets and then optimizing each subset individually, before moving on to the next subset. This allows the optimizer to converge to the optimal solution faster than a traditional optimization algorithm that evaluates all parameters at once.

In some embodiments, instead of dividing the parameters into overlapping subsets, the parameters may be divided into non-overlapping subsets. For example, each parameters may be grouped into only one subset. In some embodiments, subsets containing the same parameters may be treated as a single subset. For example, if only parameters 1 and 3 affect metric 1 and only parameters 1 and 3 affect metric 2, a single subset containing parameters 1 and 3 may be used for the optimizer.

Next, at 906, an intelligent agent 406 may determine, for a first set, or subset, of parameters, optimal values to obtain an optimal value of each metric associated with the parameters of the first set of parameters. In this way, the associated metrics for the first set may be optimized over the effective ranges for each parameter in the first set.

After dividing the parameters into subsets, each subset may be optimized. The tuning may be performed using an optimization algorithm such as gradient descent, or another optimizing algorithm as described herein. The tuning process is repeated for each subset of parameters until all subsets have been optimized.

As described herein, each parameter may be associated with one or more sets based on which metrics are affected by the value of the parameter. Each parameter in a set of parameters may be associated with a common metric or a common set of metrics. One parameter may be in a plurality of sets.

Determining the optimal parameter values to obtain the optimal value for each metric may comprise first determining the optimal value of each metric and then adjusting the parameters in a set of parameters which affect the metric until the optimal value of the metric or metrics associated with the set of parameters are achieved. The method may comprise saving the values of each parameter in the set of parameters required to achieve the optimal value of the metric or metrics associated with the set in one or more registers 209 in memory 206. These values of the parameters may be described as the optimal points to optimize the metrics associated with the set.

At 909, after determining the optimal point for each parameter in the first subset of parameters, the parameters in the first subset may be set to the optimal points and at 912, the method may continue and repeat for a second subset of parameters, until optimal points for each subset have been determined.

At 915, the method may end. It should be appreciated that after a first pass of obtaining optimal points for each parameter of each set, the method may repeat as necessary, returning to the first set and completing one or more additional passes through the sets of parameters.

In the method illustrated in FIG. 10, the results of the method of FIG. 9 may be used to initialize all the parameters associated with the detector. The parameters may then be optimized for particular metrics over effective ranges found in the first method of FIG. 8. As a result of the third method, and as described in greater detail below, the parameters for the detector are set to optimal values.

As illustrated in FIG. 10, a method of fine-tuning parameter values may be performed. The method of FIG. 10 may be described as a final tuning optimizer. To begin the method illustrated in FIG. 10, at 1000, a full set of parameters for a detector 104 to be tuned may be optimized and set to best settings using the methods of FIGS. 8 and 9 as described above. In this way, for each parameter, an effective range may be identified, and the value of each parameter may be optimized. The cyclical subset optimizer described in relation to FIG. 9 may be used at 1003 to obtain an initial setting for each parameter.

At 1006, the detector 104 may be initialized by setting the current value of each parameter to the setting obtained using the optimizer described above in relation to FIG. 9 as performed at 1003.

Next, at 1009, the value of each parameter may be adjusted to optimize each of the metrics associated with the respective parameter. The value of each parameter at the point at which the associated metric or metrics is at an optimal point may be recorded into a register 209 in memory 206 of the detector 104. Optimizing each metric associated with the respective parameter may comprise using one or more optimization techniques. For example, as described below, an intelligent agent may employ one or more of optimization, gradient descent, direct or heuristic search, Latin hypercube, Bayesian optimization, genetic algorithm, and/or other techniques in the tuning of a detector. Each of these techniques may be as described below.

In some embodiments, optimization of each metric may be performed using machine learning and other technical disciplines of tuning parameters of a sensor or detector to maximize a returned score and/or to minimize a returned score. In some embodiments, parameters may be register settings and a score may be a combined value of metrics returned from sensor data from a detector as obtained with the associated register settings.

In some embodiments, optimization may be performed by a computing system using gradient descent. Gradient descent is an optimization algorithm used in machine learning to minimize a cost function by updating parameters in the direction of steepest decrease of the cost function. Using gradient descent, parameters may be iteratively adjusted to minimize the error until the algorithm converges to a minimum value. Gradient descent is a hill climbing type optimization approach used to find a nearby local minimum and/or maximum by calculating a gradient of a cost surface. When there is no analytical gradient function, the gradient can be approximated numerically.

In some embodiments, optimization may be performed by a computing system using direct, or heuristic, search. Heuristic search is a type of optimization technique used in machine learning to find a solution to a problem by using a set of rules based on the problem's characteristics. A computing system performing heuristic search may use a heuristic function to estimate the cost of reaching the goal state from a given state and selects the next state with the lowest estimated cost. Such an approach may allow for finding an optimal parameter value faster than an exhaustive search, as only promising paths are explored.

In some embodiments, a computer system may perform optimization using a Latin hypercube. Latin hypercube is an approach applied to experiment design which systematically samples a parameter space based on some assumptions about parameter limits and the total number of samples to collect. A Latin hypercube is a statistical design technique used in experiments and simulations. Latin hypercube involves dividing the range of each input variable into equal intervals, and then selecting one sample from each interval such that the samples are evenly distributed across the interval. The result is a set of points in the input space that provide a good representation of the entire space while reducing the number of simulations required.

In machine learning, Latin hypercube sampling can be used to optimize parameters or to explore the input space in a more efficient manner. Latin hypercube can also be useful in situations where the input space is high-dimensional, or the evaluation of the objective function is computationally expensive. The evenly distributed samples provide a more robust representation of the input space, reducing the risk of overfitting or underfitting the data.

In some embodiments, a computer system may perform optimization using Bayesian optimization. Bayesian optimization is an approach to optimization to build a model of a cost surface to optimally sample future points in the parameter space.

In some embodiments, a computer system may perform optimization using dimensionality reduction. Dimensionality reduction is a technique in machine learning that is used to reduce the number of features in a dataset. The goal of dimensionality reduction is to preserve the most important information in the data while reducing the complexity of the data. This is useful in many applications, such as visualization, anomaly detection, and feature extraction.

In some embodiments, a computer system may perform optimization using t-distributed stochastic neighbor embedding (t-SNE). t-SNE is a non-linear dimensionality reduction method that maps high-dimensional data to a low-dimensional space while preserving the local structure of the data. t-SNE works by minimizing the divergence between the high-dimensional distribution and the low-dimensional distribution. t-SNE is a popular method for visualizing complex data and is widely used for exploring the structure of neural networks.

In some embodiments, a computer system may perform optimization using uniform manifold approximation and projection (UMAP). UMAP is a dimensionality reduction method that is designed to be faster and more scalable than t-SNE. UMAP uses a different optimization technique and approximates the local geometry of the data in a different way. UMAP can be used to embed data in higher-dimensional spaces, making it a good choice for visualizing high-dimensional data with more than two dimensions.

At 1012, each parameter may be set to an optimal point based on results of the optimization to achieve the optimized metric and at 1015 the method may end with the registers of the detector 104 set to optimal parameter values.

In some embodiments, an automated tuning system as described herein may also provide visualization tools which assist users in rapidly interpreting the results of the automated tuning. Visualization tools may be provided to a user by a user output 314 of the computing system 300. For example, a graphical user interface (GUI), displayed on a display device via the user output 314, may be used to illustrate to a user the optimal parameter values or acceptable parameter ranges as determined using one or more of the methods described herein. Furthermore, visualization tools may be used to illustrate the effect of each parameter of one or more particular metrics.

In some embodiments, an automated tuning system as described herein may be implemented using one or more manual settings received from a user. For example, a user may be enabled to provide settings via a user input 313 of the computing system 300. Using the user input 313, a user may be enabled, for example, to provide initial settings, select options, or to provide feedback to the automated tuning system as described herein.

The systems and methods described herein provide faster and more consistent results and yield more accurate and precise results as compared to using manual methods. Using systems and methods as described herein, an intelligent agent can perform a broad search by intelligently searching a wider trade space in less time than manual methods. After the broad search is complete, the intelligent agent may perform a fine tuning within a narrower range to further refine the optimization settings.

As described herein, systems and methods may utilize ML models to improve and automate the process of tuning parameters for a wide variety of systems. Because using a brute force random search to tune parameters may be intractable due to the number of and ranges of parameters needing to be tuned, a more intelligent method of tuning the parameters is required. Using the systems and methods described herein, and through the use of ML models, relationships between certain parameter sets and metrics of interest can be leveraged and exploited to tune the parameters in a time-efficient manner, far surpassing the abilities of humans acting alone.

As described herein, incorporating artificial intelligence or ML into the detector tuning process to (1) improve performance over the current state-of-the-art by achieving a more accurately tuned system; (2) shorten the time to tune detectors; and (3) enable more autonomous detector tuning.

As described herein, autonomous agents may be used to quickly find parameter settings that improved performance on the selected metrics above an initial coarsely tuned setting. The settings may be obtained, for example, in less than a day of data collection and analysis and are comparable to or exceed the performance achieved by detector engineers after months of careful tuning. It should be appreciated that while the systems and methods described herein relate to a detector device, the same or similar methods may be used to tune other types of register-based sensors or other systems with tunable parameters.

It is to be appreciated that any feature described herein can be claimed in combination with any other feature(s) as described herein, regardless of whether the features come from the same described embodiment.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the application or use. It is intended that the appended claims be construed to include alternative embodiments to the extent permitted by the prior art.

What is claimed is:

1. A system comprising:
    a processor; and
    a computer-readable storage medium storing computer-readable instructions which, when executed by the processor, cause the processor to execute a method, the method comprising:
    identifying a respective starting value for each of a plurality of registers, wherein each register stores a value of a parameter of a detector system;
    determining, for each register, a respective effective range of reasonable returns by binary searching to find an upper limit of reasonable returns and a lower limit of reasonable returns;
    determining, for each register, a respective optimal value within the respective effective range of reasonable returns by optimizing one or more metrics over the respective effective range of reasonable returns for each register; and
    setting each register to the respective optimal value.

2. The system of claim 1, wherein the respective starting value is manually set.

3. The system of claim 1, wherein determining the respective effective range of reasonable returns comprises, for each register:
    leaving all registers in a starting configuration;
    binary searching upward to find the upper limit of reasonable returns;
    binary searching downward to find the lower limit of reasonable returns;
    saving a result of the binary searching upward and the binary searching downward as the respective effective range of reasonable returns; and
    returning to the starting configuration.

4. The system of claim 1, wherein optimizing the one or more metrics over the respective effective range of reasonable returns comprises, for a first set of registers associated with a first set of metrics, optimizing metrics of the first set of metrics, and setting each register of the first set of registers to the respective optimal value.

5. The system of claim 1, wherein setting each register to the respective optimal value comprises:
    initializing each register to a value within the respective effective range of reasonable returns;
    optimizing metrics over the respective effective range for each register; and
    setting each register to the optimized metrics.

6. The system of claim 1, wherein the method further comprises using the respective optimal value of each register to tune a detector.

7. The system of claim 1, wherein the respective optimal value within the respective effective range for each register is determined based on one or more of a gradient descent, a direct search, a Latin hypercube algorithm, and a Bayesian optimization algorithm.

8. A method for tuning a detector, the method comprising:
    identifying a respective starting value for each of a plurality of registers;
    determining, for each register, a respective effective range of reasonable returns by binary searching to find an upper limit of reasonable returns and a lower limit of reasonable returns;
    determining, for each register, a respective optimal value within the respective effective range of reasonable returns by optimizing one or more metrics over the respective effective range of reasonable returns for each register; and
    setting each register to the respective optimal value.

9. The method of claim 8, wherein the respective starting value is manually set.

10. The method of claim 8, wherein determining the respective effective range of reasonable returns comprises, for each register:
leaving all registers in a starting configuration;
binary searching upward to find the upper limit of reasonable returns;
binary searching downward to find the lower limit of reasonable returns;
saving a result of the binary searching upward and the binary searching downward as the respective effective range of reasonable returns; and
returning to the starting configuration.

11. The method of claim 8, wherein optimizing the one or more metrics over the respective effective range of reasonable returns comprises, for a first set of registers associated with a first set of metrics, optimizing metrics of the first set of metrics, and setting each register of the first set of registers to the respective optimal value.

12. The method of claim 8, wherein setting each register to the respective optimal value comprises:
initializing each register to a value within the respective effective range of reasonable returns;
optimizing metrics over respective effective range for each register; and
setting each register to the optimized metrics.

13. The method of claim 8, further comprising using the respective optimal value of each register to tune a detector.

14. The method of claim 8, wherein the respective optimal value within the respective effective range for each register is determined based on one or more of a gradient descent, a direct search, a Latin hypercube algorithm, and a Bayesian optimization algorithm.

15. A tuning system for a sensor, the system comprising:
at least one sensor;
a processor; and
a computer-readable storage medium storing computer-readable instructions which, when executed by the processor, cause the processor to execute a method, the method comprising:
identifying a respective starting value for each of a plurality of registers, wherein each register stores a value of a parameter of a detector system;
determining, for each register, a respective effective range of reasonable returns by binary searching to find an upper limit of reasonable returns and a lower limit of reasonable returns;
determining, for each register, a respective optimal value within the respective effective range of reasonable returns by optimizing one or more metrics over the respective effective range of reasonable returns for each register; and
setting each register to respective optimal value.

16. The system of claim 15, wherein the respective starting value is manually set.

17. The system of claim 15, wherein determining the respective effective range of reasonable returns comprises, for each register:
leaving all registers in a starting configuration;
binary searching upward to find the upper limit of reasonable returns;
binary searching downward to find the lower limit of reasonable returns;
saving a result of the binary searching upward and the binary searching downward as the respective effective range of reasonable returns; and
returning to the starting configuration.

18. The system of claim 15, wherein optimizing the one or more metrics over the respective effective range of reasonable returns comprises, for a first set of registers associated with a first set of metrics, optimizing metrics of the first set of metrics, and setting each register of the first set of registers to the respective optimized value.

19. The system of claim 15, wherein setting each register to the respective optimal value comprises:
initializing each register to a value within the respective effective range of reasonable returns;
optimizing metrics over the respective effective range for each register; and
setting each register to the optimized metrics.

20. The system of claim 15, wherein the method further comprises using the respective register values to tune a detector.

* * * * *